United States Patent [19]
Tatsuzawa et al.

[11] Patent Number: 5,771,216
[45] Date of Patent: *Jun. 23, 1998

[54] PHOTOMAGNETIC RECORDING DEVICE AND PHOTOMAGNETIC REPRODUCING DEVICE

[75] Inventors: Kaichi Tatsuzawa; Shosuke Tanaka; Shigeaki Koike, all of Kanagawa, Japan

[73] Assignee: Sony Corporation, Tokyo, Japan

[ * ] Notice: The term of this patent shall not extend beyond the expiration date of Pat. No. 5,640,379.

[21] Appl. No.: 835,202

[22] Filed: Apr. 7, 1997

Related U.S. Application Data

[63] Continuation of Ser. No. 646,222, Jan. 28, 1991, Pat. No. 5,640,379.

[30]    Foreign Application Priority Data

Jan. 31, 1990   [JP]   Japan  .................................... 2-020919

[51] Int. Cl.[6] .................................................. G11B 7/00
[52] U.S. Cl. .................. 369/59; 369/48; 369/13
[58] Field of Search ............................ 369/59, 109, 48, 369/116, 13, 100, 32, 47, 58, 54

[56]                References Cited

U.S. PATENT DOCUMENTS

| | | | |
|---|---|---|---|
| 4,646,103 | 2/1987 | Sugiyama et al. ...................... | 369/109 |
| 4,873,680 | 10/1989 | Chung et al. ........................... | 369/116 |
| 5,001,692 | 3/1991 | Farla et al. .............................. | 369/116 |
| 5,007,039 | 4/1991 | Sakemoto et al. ...................... | 369/116 |
| 5,038,338 | 8/1991 | Terao et al. ............................. | 369/116 |
| 5,065,377 | 11/1991 | Spruit et al. ............................ | 369/116 |
| 5,083,212 | 1/1992 | Owa et al. .............................. | 358/330 |

*Primary Examiner*—Muhammad N. Edun
*Attorney, Agent, or Firm*—Frommer Lawrence & Haug LLP; William S. Frommer

[57]                ABSTRACT

In photomagnetic recording device and photomagnetic reproducing device where a record light beam is irradiated to a photomagnetic record medium in response to a record light thereby a pit is formed on the photomagnetic record medium, and a reproducing light beam is irradiated to the pit on the photomagnetic record medium thereby the record information is reproduced, since the record light beam is emitted intermittently in the light irradiation period that the pit is to be formed on the photomagnetic record medium among the record signal, the pit of nearly circular shape can be formed on the photomagnetic record medium, thus the information can be recorded on the photomagnetic record medium at high accuracy.

1 Claim, 15 Drawing Sheets

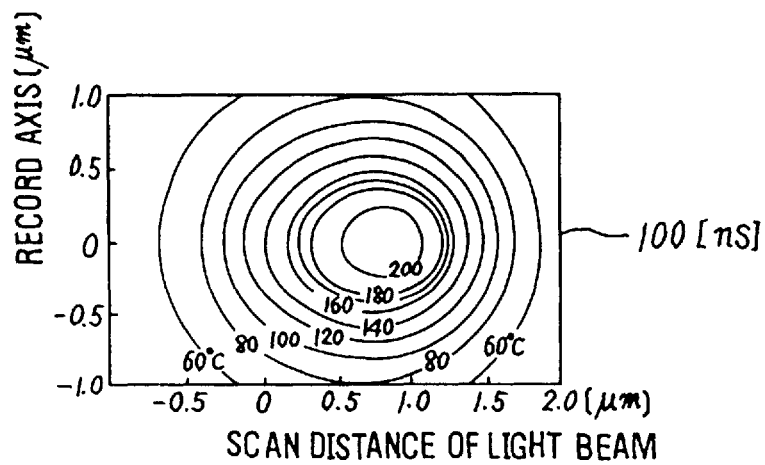
F I G. 3 (A) (PRIOR ART)
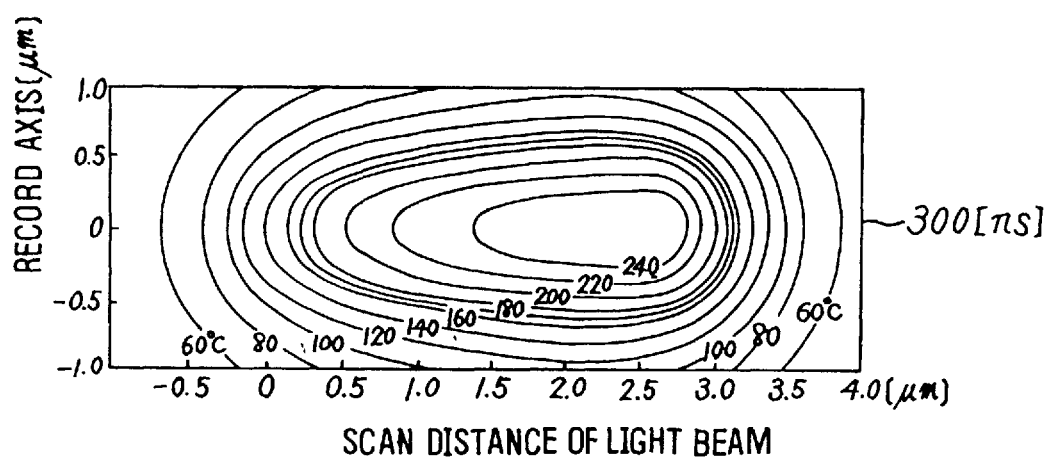
F I G. 3 (B) (PRIOR ART)

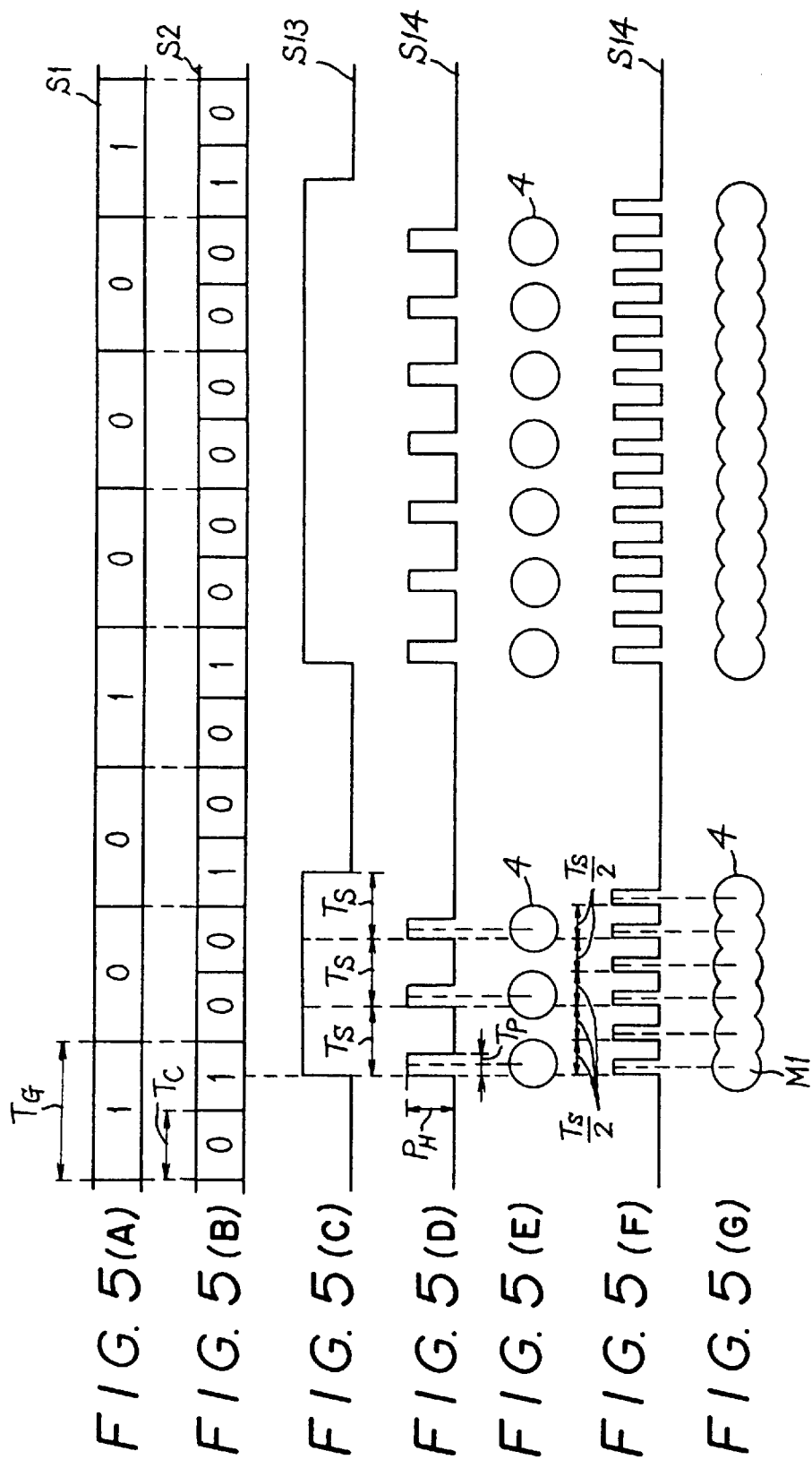

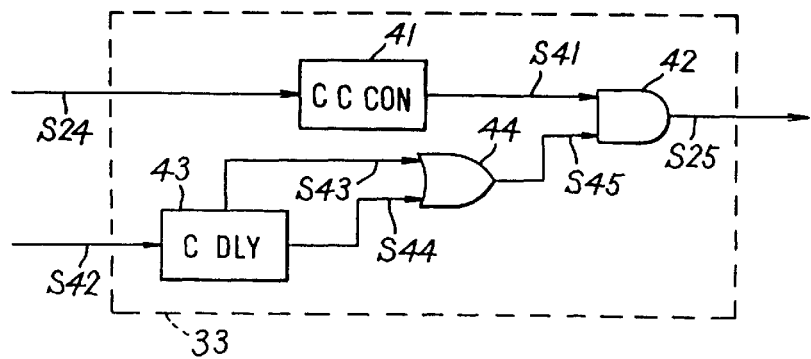
FIG. 8
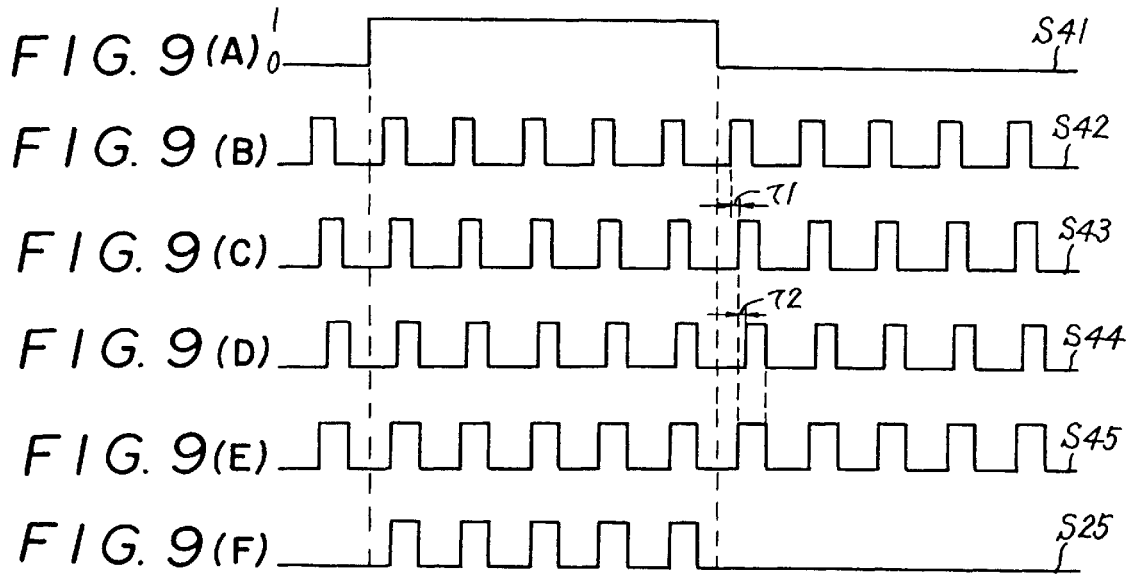

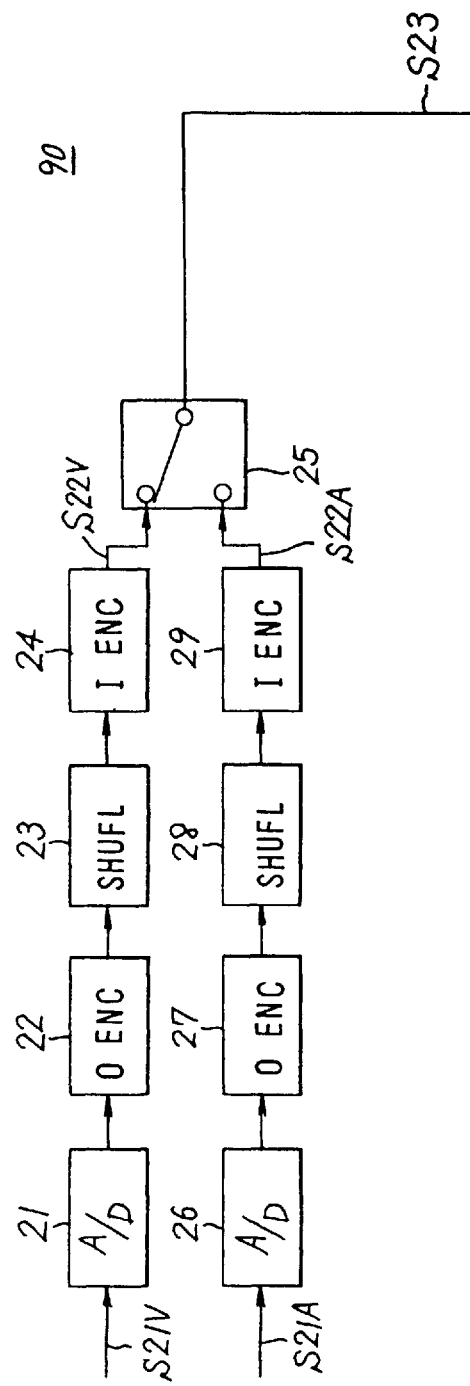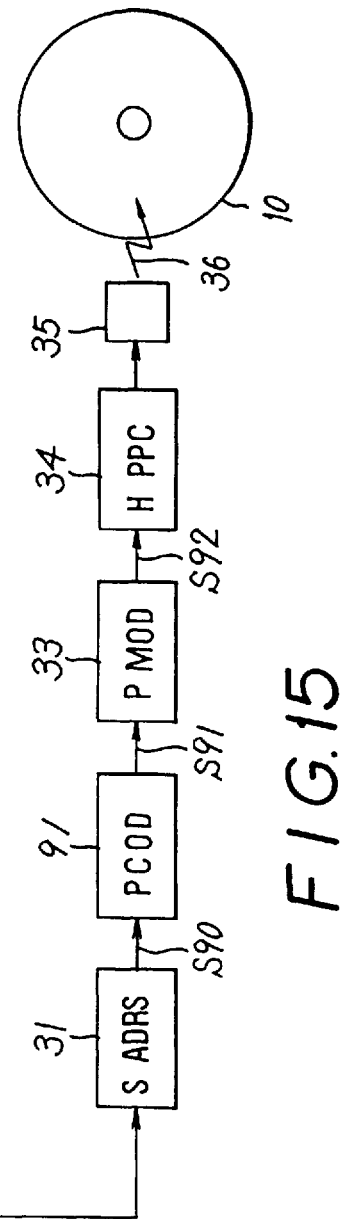
F I G. 15

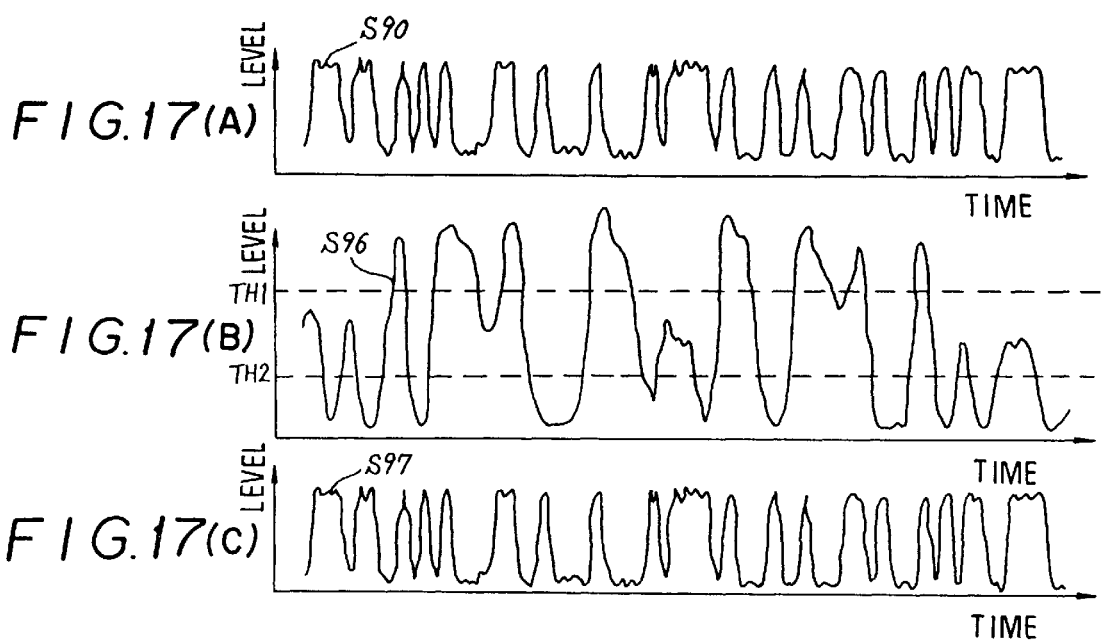
FIG.17(A)
FIG.17(B)
FIG.17(C)
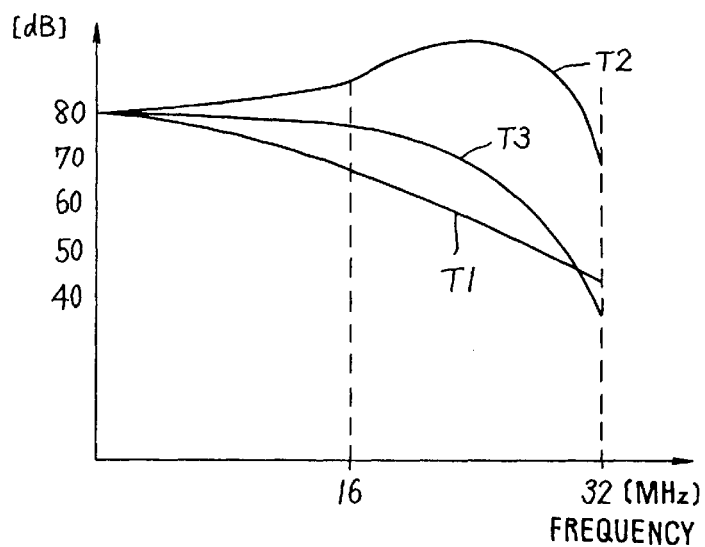
FIG.18

PHOTOMAGNETIC RECORDING DEVICE AND PHOTOMAGNETIC REPRODUCING DEVICE

This application is a continuation of application Ser. No. 07/646,222, filed Jan. 28, 1991 now U.S. Pat. No. 5,640,379.

BACKGROUND OF THE INVENTION

1. Field of the Invention

The present invention relates to photomagnetic recording device and photomagnetic reproducing device, and more particularly to device applied favorably to a photomagnetic reproducing apparatus where a pit being a magnetic domain with shape corresponding to record information is formed on a photomagnetic record medium.

2. Description of the Prior Art

In a photomagnetic record reproducing apparatus as shown in FIG. 1, a record light beam 3 comprising a magnetizing magnetic flux 2 and a laser luminous flux is irradiated to a photomagnetic record disk 1 as a photomagnetic record medium rotating in arrow "a" direction, and an irradiation region of the record light beam 3 is heated to prescribed temperature (Curie point temperature) or more thereby a magnetic domain constituting a pit 4 is formed in the irradiation region, thus information is recorded by timing (or record position) forming length of the pit 4 and/or the start end, the finishing end.

In a record light beam generating section 5 for generating the record beam 3 based on a record source signal S1 of one bit period $T_G$ as shown in FIG. 2A, the data is converted into a code signal, for example, by the NRZ conversion system and a channel code signal S2 of the bit period $T_C$ ($=T_G/2$) is formed as shown in FIG. 2B, and when bit data of the channel code signal S2 enters an interval of logic "1" data, a record signal S3 with logic level varying in the timing delayed by the delay time $T_R$ ($=T_C/2$). is generated as shown in FIG. 2C.

A light source comprising a laser diode for example is driven by the record signal S3, thereby the record light beam 3 emitted from the laser light source is irradiated to the photomagnetic record disk 1 in the timing of the record signal S3 rising to logic "1" level. As a result, the pit 4 comprising a magnetic domain as shown in FIG. 2D is formed on the photomagnetic record disk 1.

Thus the forming position of the start end 4A of the pit 4 corresponds to prescribed logic "1" bit data among the bit data of the channel code signal S2, and the finishing end 4B corresponds to logic "1" data subsequently generating. Thus the record information representing the channel code signal S2 can be recorded as a magnetization pattern on the photomagnetic record disk 1 by length between the start end 4A and the finishing end 4B of the pit 4 or positions of the start end 4A and the finishing end 4B.

As shown in FIGS. 2E and 2F corresponding to FIGS. 2C and 2D, a record signal S3 with prescribed pulse width is generated in the timing of the channel code signal S2 becoming logic "1" data (FIG. 2E), thereby manner of forming the pit 4 comprising a magnetic domain isolated at every time may be also used.

However, shape of the magnetic domain constituting the pit 4 formed on the photomagnetic record disk 1 in this case becomes that tapering towards the top end in the start end 4A (so-called tear drop shape) in practice. Consequently, when the pit 4 is to be reproduced, there is fear of generating data error in the reproduced signal corresponding to the start end 4A.

In addition, since width of the magnetic domain becomes narrower towards the top end at the start end 4A of the pit 4, the leakage magnetic flux generated from the magnetic domain becomes weak. As a result, the real start position of the start end 4A cannot be clearly reproduced.

Reason why the pit 4 becomes tear drop shape at the start end 4A is in that when the light beam 3 starts the irradiation, the photomagnetic record disk 1 travels in the traveling direction "a", thereby the accumulated light quantity of the laser light irradiated to the top end portion becomes insufficient in comparison to the rearward portion succeeding the top end portion. It is confirmed by an experiment that the temperature distribution of the magnetic domain on the photomagnetic record disk 1 irradiated by the record light beam 3 becomes significantly larger into the tear drop shape distribution in the case of the long irradiation time in comparison to the case of the short irradiation time as shown in FIGS. 3A and 3B.

In addition, the case of FIG. 3B shows shape of the magnetic domain when the record light beam 3 is irradiated continuously during 300 ns. In this case, shape of equi-temperature line becomes the significant tear drop shape and therefore shape of the equi-temperature line of the temperature representing the Curie point also has the clear tear drop shape.

On the contrary, when the irradiation time of the record light beam 3 becomes nearly ⅓, i.e., 100 ns, the tear drop shape phenomenon of the equi-temperature line cannot progress much.

Degree of the asymmetry of the thermal distribution as shown in FIG. 4 is apt to become significant as the irradiation time becomes long.

When the record light beam is irradiated, the temperature rise produced at the position (x, y, z) of the photomagnetic record disk 10 by the thermal diffusion can be expressed by following formula.

$$T(x, y, z) = \int_{-\infty}^{t} \int_{-\infty}^{\infty} \int_{-\infty}^{\infty} G(x - x_o, y - y_o, z, t - t_o) \, Q(x_o, y_o, t_o) dx_o dy_o dt_o \quad (1)$$

This is convolution of the Green function G and the power distribution function Q, and if the pulse width of the record signal S3 increases, influence of the thermal diffusion becomes significant corresponding to this, thereby the asymmetry of the thermal diffusion increases and the rear drop shape becomes significant.

In order to prevent the tear drop phenomenon of the magnetic domain, intensity of the laser power of the record light beam forming the top end portion of the pit 4 may be controlled to form the pit. In this case, however, the bit separation at the reproducing side is not complete, and this method is still insufficient as a solution of the problems.

SUMMARY OF THE INVENTION

In view of the above-mentioned problems in the prior art, an object of the invention is to provide photomagnetic recording device and photomagnetic reproducing device wherein when information is recorded and reproduced to a photomagnetic record medium, fear of producing error in the reproduced data based on the tear drop shape phenomenon of the recorded pit can be avoided effectively.

In an aspect of the invention to solve the problems, in photomagnetic recording device where a record light beam is irradiated to a photomagnetic record medium 1, 78 in response to a record signal S13, S73 thereby a pit 4, 80 is formed on the photomagnetic record medium 1, 78, the record light beam is generated in pulse shape intermittently thereby the pit 4, 80 is formed so that a magnetic domain in nearly circular shape is arranged in sequence to be overlapped or isolated.

In another aspect of the invention, in photomagnetic recording device where a record light beam is irradiated to a photomagnetic record medium 78 in response to a record signal S73 thereby a pit 80 is formed on the photomagnetic record medium 78, the record light beam is generated intermittently corresponding to period of a carrier signal thereby a pit 80 representing the frequency modulation information is formed, and the record light beam corresponding to the start end portion and the finishing end portion of the pit 80 is generated in isolated pulse shape so that a magnetic domain in nearly circular shape is arranged to be overlapped and a pit portion is formed.

Further in another aspect of the invention, in photomagnetic reproducing device where a record light beam 36 is irradiated to a photomagnetic record medium 1, 10 in response to a record signal S13, S90 thereby a pit 4 is formed on the photomagnetic record medium 1, 10, and a reproducing light beam 51 is irradiated to the pit 4 on the photomagnetic record medium 1, 10 and the record information is reproduced, during the recording, the record light beam 36 is generated in pulse shape intermittently thereby the pit 4 is formed so that a magnetic domain in nearly circular shape is arranged to be overlapped or isolated, and during the reproducing, multi-value reproducing is performed regarding reproducing information 95 obtained by irradiating the reproducing light beam 51 to the pit 4.

If a record light beam is generated in pulse shape intermittently, a magnetic domain in nearly circular shape can be formed on a photomagnetic record medium 1, 78, thereby shape of a pit 4, 80 formed on the photomagnetic record medium 1, 78 can be made non-tear drop shape.

Thus deterioration of the record information to be produced in the tear drop shape can be prevented.

BRIEF DESCRIPTION OF THE DRAWINGS

FIGS. 3A and 3B are characteristic curve diagrams explaining tear drop shape phenomenon of a magnetic domain;

FIGS. 5A–5G are signal waveform charts showing principle of photomagnetic recording method according to the invention;

FIG. 8 is a connection diagram showing detailed constitution of a pulse modulation circuit of the photomagnetic recording apparatus in FIG. 6;

FIGS. 9A–9F are signal waveform charts showing signal of each part of the pulse modulation circuit;

FIG. 15 is a block diagram showing a photomagnetic recording apparatus of a third embodiment;

FIGS. 17A–17C are signal waveform charts showing signal of each part of the photomagnetic recording apparatus and the photomagnetic reproducing apparatus in FIG. 15 and FIG. 16; and FIG. 18 is a characteristic curve diagram explaining each part of the photomagnetic reproducing apparatus in FIG. 12.

DESCRIPTION OF THE PREFERRED EMBODIMENTS

Embodiments of the invention will be described in detail referring to the accompanying drawings as follows.

(1) Principle of Photomagnetic Recording Method

Figure 1:
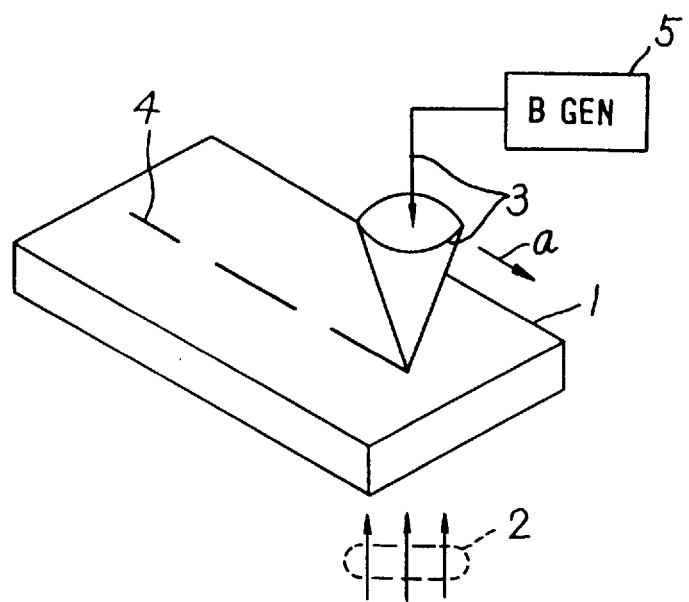
FIG. 1 is a perspective view schematically explaining photomagnetic recording.
Figure 4:
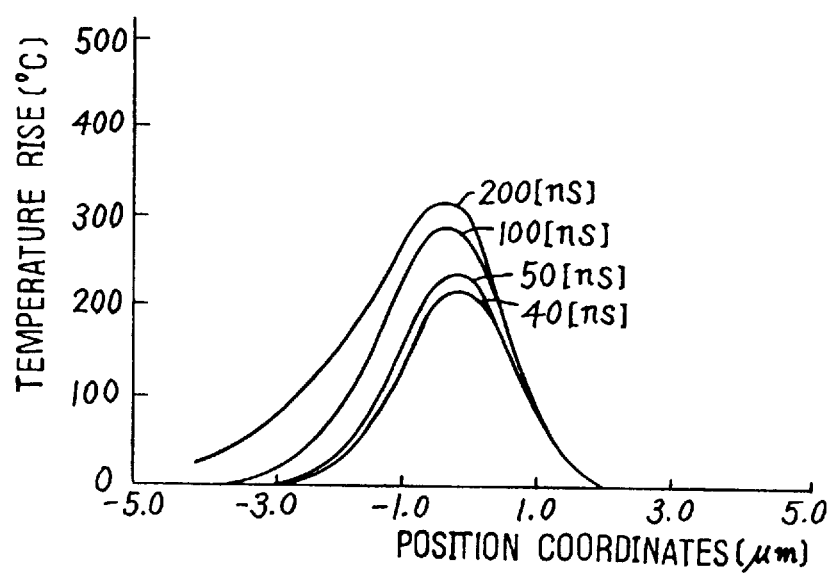
FIG. 4 is a characteristic curve diagram explaining tear drop shape phenomenon of a magnetic domain.
Figures 2A, 2B, 2C, 2D, 2E, 2F:
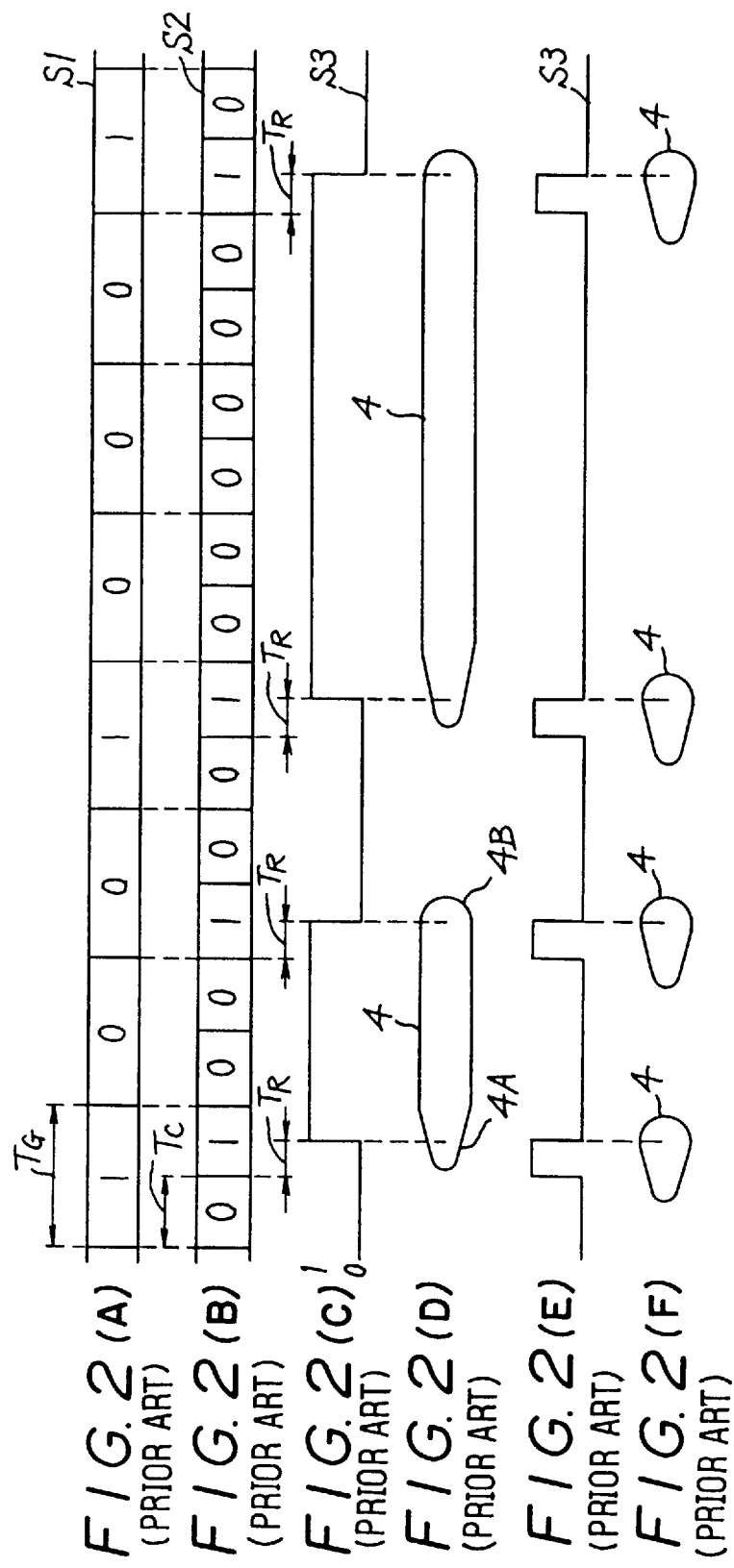
FIGS. 2A–2F are signal waveform charts explaining photomagnetic recording method in the prior art.

In photomagnetic recording method according to the invention as shown in FIGS. 5A–5G corresponding to FIGS. 2A–2F, a record signal S13 (FIG. 5C) formed based on a record source signal S1 (FIG. 5A) through a channel code signal S2 (FIG. 5B) is not used in original condition as a drive signal to generate a record light beam 3 (FIG. 1), but as shown in FIG. 5D, a drive pulse signal S14 obtained by sampling the record signal S13 is generated per prescribed sampling period $T_S$ (for example, $T_S=T_C$).

In this case, pulse width $T_P$ and pulse amplitude $P_H$ of the drive pulse signal S14 are selected to such values that when a laser light emission source is excited by each pulse of the drive pulse signal S14, a pit 4 formed on a photomagnetic record disk 1 by the record light beam 3 becomes substantially circular shape.

Thus on the photomagnetic record disk 1, as shown in FIG. 5E, while the record signal S13 rises to logic "1" level, the pit 4 of substantially circular shape is formed per the sampling period $T_S$. On the contrary, while the signal level of the record signal S13 falls to logic "0" level, the drive pulse signal S14 is not generated thereby the pit 4 is not formed as shown in FIG. 5E.

In the case of the embodiment, since the sampling period $T_S$ is selected nearly to the bit period $T_C$ of the channel code signal S2, the pit 4 is constituted so that magnetic domains of nearly circular shape isolated from each other are arranged in series of pit rows.

In constitution as shown in FIGS. 5D and 5E, since the pit 4 corresponding to the record signal S13 is formed on the photomagnetic record disk 1, while the record signal S13 is at logic "1" level, the magnetic domain row constituted by the circular pit 4 isolated from each other can be formed in sequence.

Consequently, while the record signal rises to logic "1" level, the arrangement number (hence the arrangement length) of the pit 4 formed to be arranged in series of pit row is discriminated thereby the record signal S13 can be reproduced.

Also the record position of the pit 4 at the rise or fall of the record signal S13 is discriminated, thereby the record signal S13 can be reproduced from the photomagnetic record disk 1.

In this case, the sampling period $T_S$ can be selected to arbitrary period if necessary, and if the sampling period is selected to smaller value gradually, corresponding to this, the number of the pit 4 generated during the record signal S13 rising to logic "1" level increases, thereby distance between the magnetic domains having nearly circular shape is narrowed. However, as long as each pit 4 is isolated, shape of the pit 4 is in nearly circular shape similarly to the case shown in FIG. 5E.

In addition to this, as shown in FIGS. 5F and 5G, when the sampling period is further shortened until respective magnetic domains constituting the pit 4 overlap each other, regarding the magnetic domain succeeding the magnetic domain at the recording start state, the record width is slightly extended by influence of the heating effect in the magnetic domain just before this domain. Also in this case, the magnetic domain at the top side is formed under nearly the same condition as that of the isolated pit and therefore becomes nearly circular shape.

Consequently, also in FIGS. 5F and 5G, reproducing signal corresponds to the record signal S13 can be securely reproduced.

(2) First Embodiment

Figure 6:
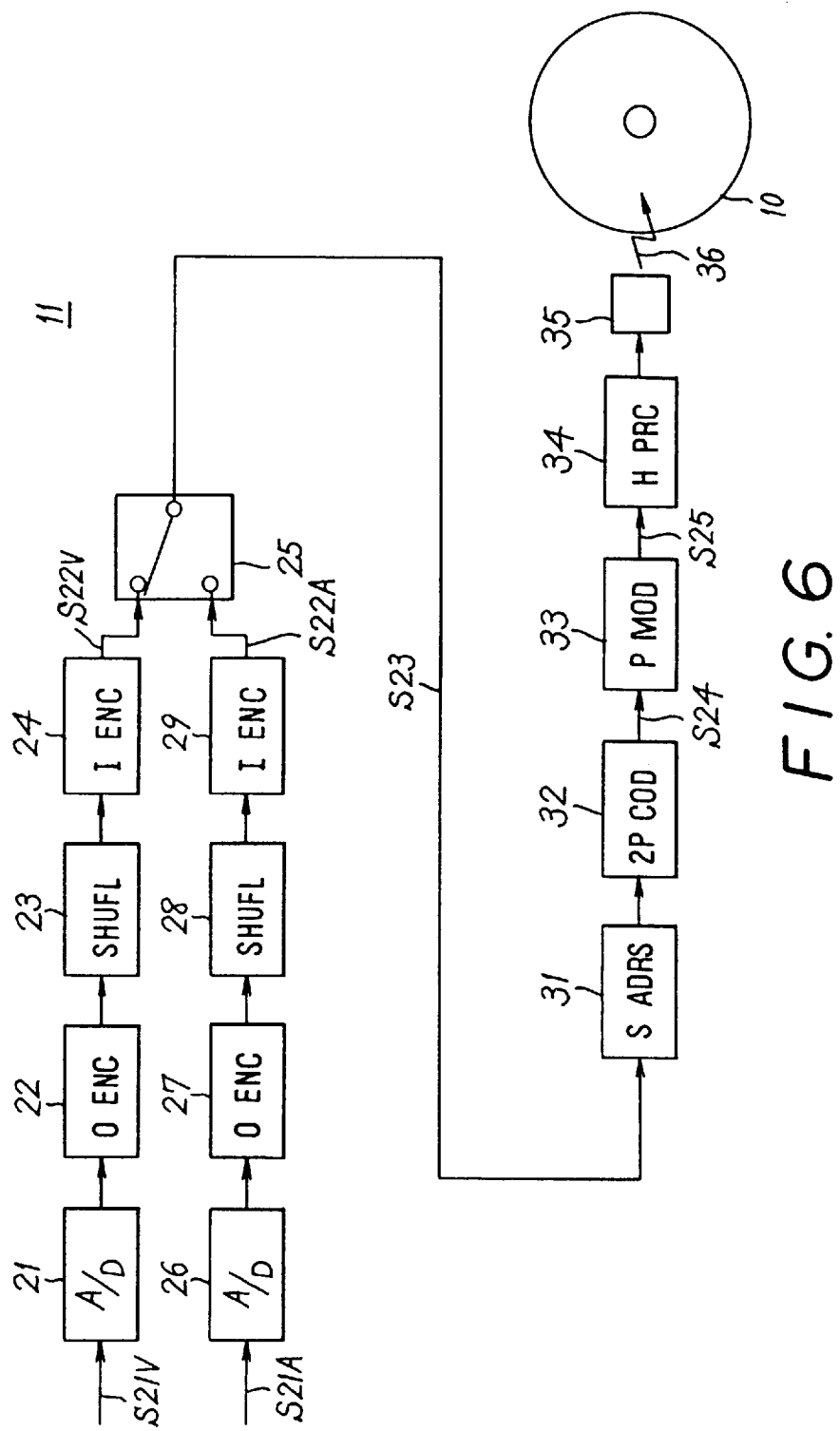
FIG. 6 is a block diagram showing a photomagnetic recording apparatus constituting a first embodiment to which photomagnetic recording method according to the invention is applied.
Figure 7:
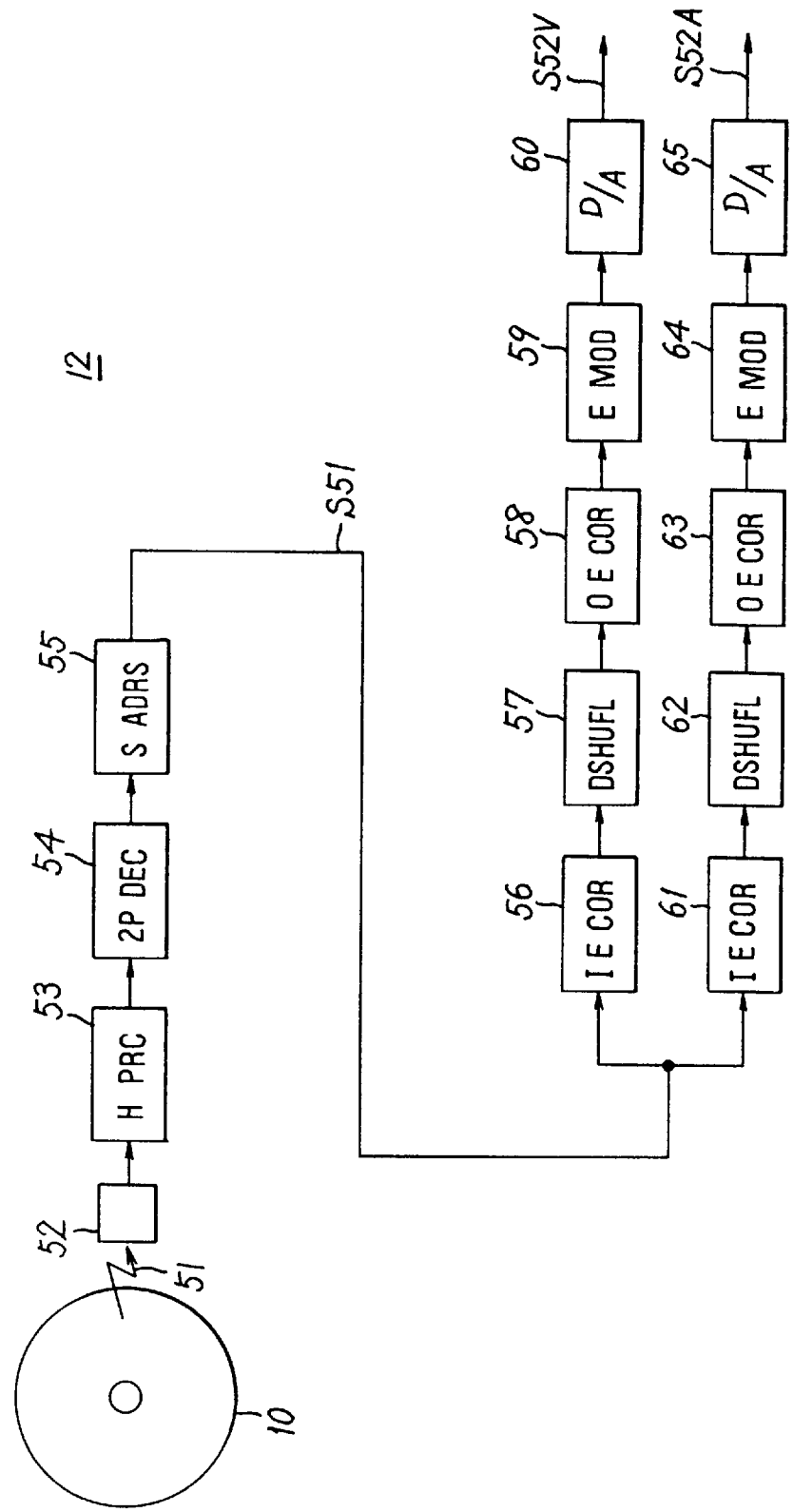
FIG. 7 is a block diagram of a photomagnetic reproducing apparatus constituting a first embodiment to which photomagnetic recording method according to the invention is applied.

FIGS. 6 and 7 show a photomagnetic recording apparatus 11 and a photomagnetic reproducing apparatus 12 as a first embodiment for recording and reproducing the digital information to a photomagnetic record disk 10 based on the principle of the photomagnetic recording method as above described referring to FIGS. 5A–5G. In the photomagnetic recording apparatus 11, a video input signal S21V received in an analog/digital converter 21 is added by outer error correction code in an outer encoder 22, and then shuffling processing is executed in a shuffling circuit 23 and digital data obtained at the output end is subjected to processing of adding inner error code in an inner encoder 24 and supplied as video data S22V to a time division multiplexer 25.

Also in the photomagnetic recording apparatus 11, an audio input signal S21A received in an analog/digital converter 26 is converted into a digital signal and added by outer error code in an outer encoder 27 and then subjected to shuffling processing in a shuffling circuit 28, and digital data obtained at the output end is added by inner error code in an inner encoder 29 and supplied as audio data S22A to the time division multiplexer 25.

In the photomagnetic recording apparatus 11, the video data S22A and the audio data S22B are subjected to time division combining at prescribed format in the time division multiplexer 25, and the composite signal S23 is added by a synchronous signal and an address signal in a synchronous address adding circuit 31 if necessary, and then is converted into a record source signal S24 comprising a two-phase code signal having different period corresponding to the signal level of the digital data in a two-phase coding circuit 32, and the converted signal is supplied to a pulse modulation circuit 33.

Based on the record source signal S24 comprising a similar signal to the record source S13 as above described regarding FIG. 5A, the pulse modulation circuit 33 generates a drive pulse signal S25 comprising a similar signal to the drive pulse signal S14 as above described regarding FIGS. 5D and 5F, and the drive pulse signal S25 passes through an optical head processor 34 and is irradiated as a record light beam 36 from a light source 35 comprising a laser diode onto the photomagnetic record disk 10.

In the case of the embodiment, as shown in FIG. 8, the pulse modulation circuit 33 converts the record source signal S24 in a channel code converter 41 in similar manner to the above description regarding FIGS. 5A, 5B and 5C into a record signal S41 (FIG. 9A) having prescribed rise width in response to the record information, and the record signal S41 is supplied as a first input signal to an AND circuit 42.

In addition to this, the pulse modulation circuit 33 delays a clock pulse S42 (FIG. 9B) in a clock delay circuit S43, thereby first and second delay clock pulse signals S43 and S44 (FIGS. 9C and 9D) delayed by delay times $\tau_1$ and $\tau_2$ are generated respectively, and the first and second delay clock pulse signals S43 and S44 are combined in an OR circuit 44 so as to form a composite clock pulse signal S45 (FIG. 9E).

In this case, the first and second delay clock pulse signals S43 and S44 are formed in that the clock pulse signal S42 is delayed by the delay times $\tau_1$ and $\tau_2$ in sequence thereby the delay clock pulse signals S43 and S44 are transmitted. Thus the composite clock pulse signal S45 (FIG. 9E) rises at the time delayed by the delay time $\tau_1$ from the rise time of the clock pulse signal S42, and has the pulse width determined based on the delay time $\tau_2$. Consequently, in order to obtain a drive pulse signal S25, the rise timing and the pulse width can be set if necessary.

The composite pulse signal S45 is supplied as a second input signal to the AND circuit 42, thus the composite clock pulse signal S45 generated during the rise of the record signal S41 to logic "1" level is transmitted as the drive pulse signal S25 (FIG. 9F).

Thus in the pulse modulation circuit 33, the drive pulse signal S25 having the pulse number corresponding to the period of the rise of the record signal S41 to logic "1" level is supplied to the optical head processor 34.

According to the photomagnetic recording apparatus 11 of FIG. 6, the light source 35 is not lit directly by the record signal S41 (FIG. 8, FIG. 9) formed based on the record source signal S24 but pulse modulation to a drive pulse signal S25 generated in the prescribed period is performed, and the light source 35 is driven intermittently by the drive pulse signal S25, so that a nearly circular magnetic domain can be formed at the start end of the pit 4 formed on the photomagnetic record disk 10 thereby the record information at the start end of the pit 4 can be recorded correctly.

When the record information is reproduced from the pit 4 formed on the photomagnetic record disk 10 in such manner, a photomagnetic reproducing apparatus 12 (FIG. 7) receives a reflected light beam 51 from the photomagnetic record disk 10 at a light pickup 52, and decodes the reflected light beam 51 at a two-phase decoder 54 through an optical head processor 53 and supplies it to a synchronous address decoder 55.

Thus a composite signal S51 being a signal similar to the composite signal S23 obtained at the output end of the time division multiplexer 25 of the photomagnetic recording apparatus 11 can be obtained at the output end of the synchronous address decoder 55, and video data included in the composite signal S51 is subjected to error correction processing in an inner error correction circuit 56 and then subjected to deshuffling in a deshuffling circuit 57, and further subjected to outer error correction processing in an outer error correction circuit 58 and error modification processing in an error modification circuit 59 and then transmitted as a video output signal S52V through a digital/analog converter 60.

At the same time, audio data included in the composite signal S51 is also reproduced through an inner error correction circuit 61, a deshuffling circuit 62, an outer error correction circuit 63, an error modification circuit 64 and a digital/analog converter 65 into an audio output signal S52A.

Thus in the photomagnetic reproducing apparatus 12, the record information can be reproduced from the pit 4 formed on the photomagnetic record disk 10, and in this constitution, shape at the start end of the pit 4 is not made tear drop shape as in the prior art, thereby fear of generating error from the start end can be reduced significantly.

(3) Second Embodiment

Figure 10:
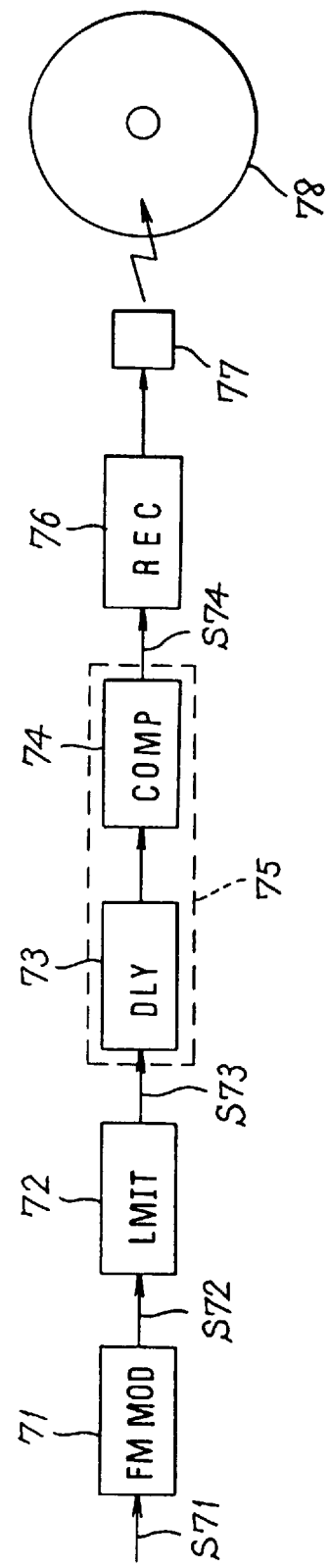
FIG. 10 is a block diagram showing a photomagnetic recording apparatus of a second embodiment.

FIG. 10 shows a second embodiment where an input signal is modulated in FM modulation and recorded on an photomagnetic record disk thereby analog information can be recorded.

Figure 13:
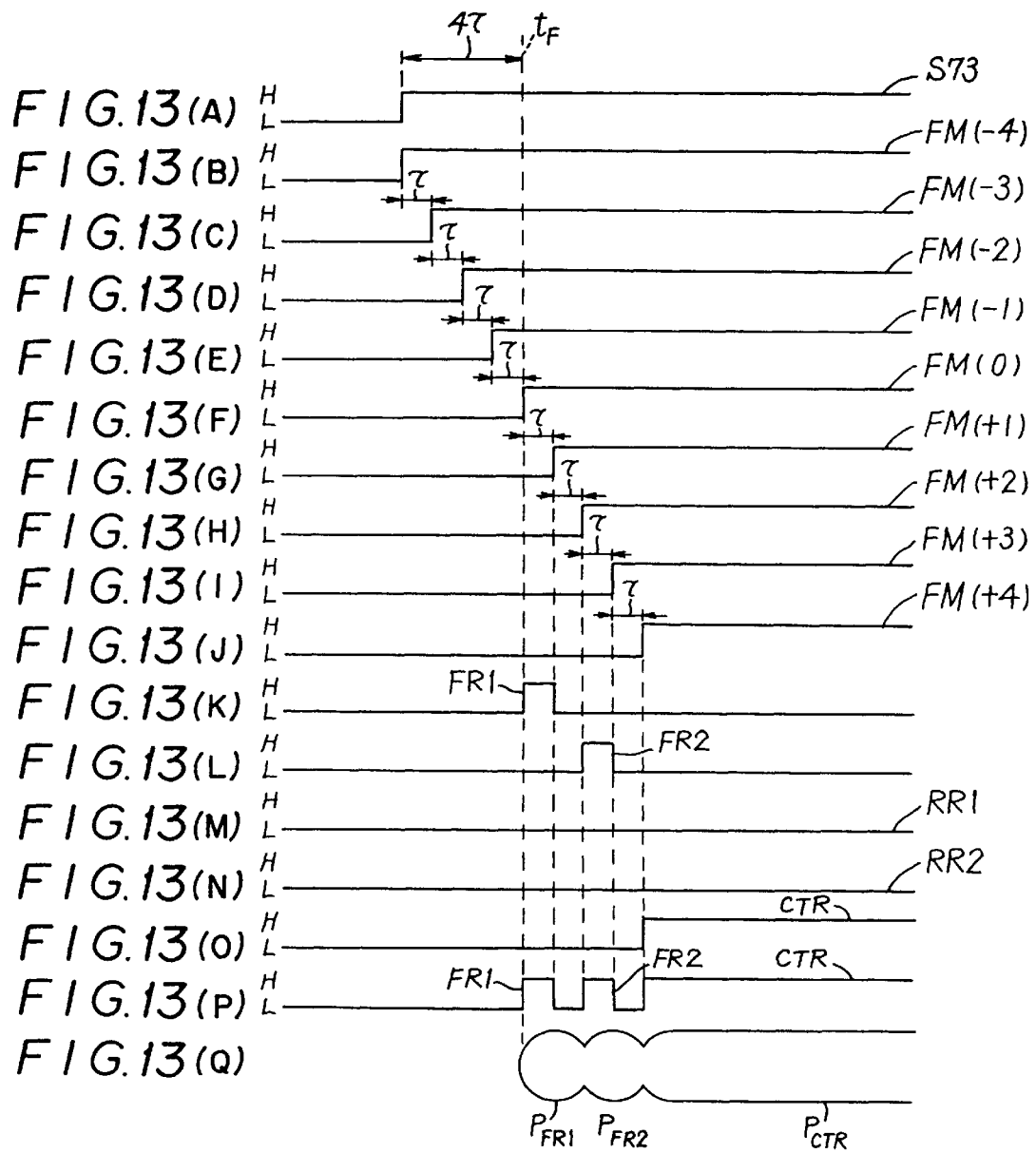
FIGS. 13A–13Q are signal waveform charts showing signal of each part of FIG. 11 and FIG. 12.
Figure 14:
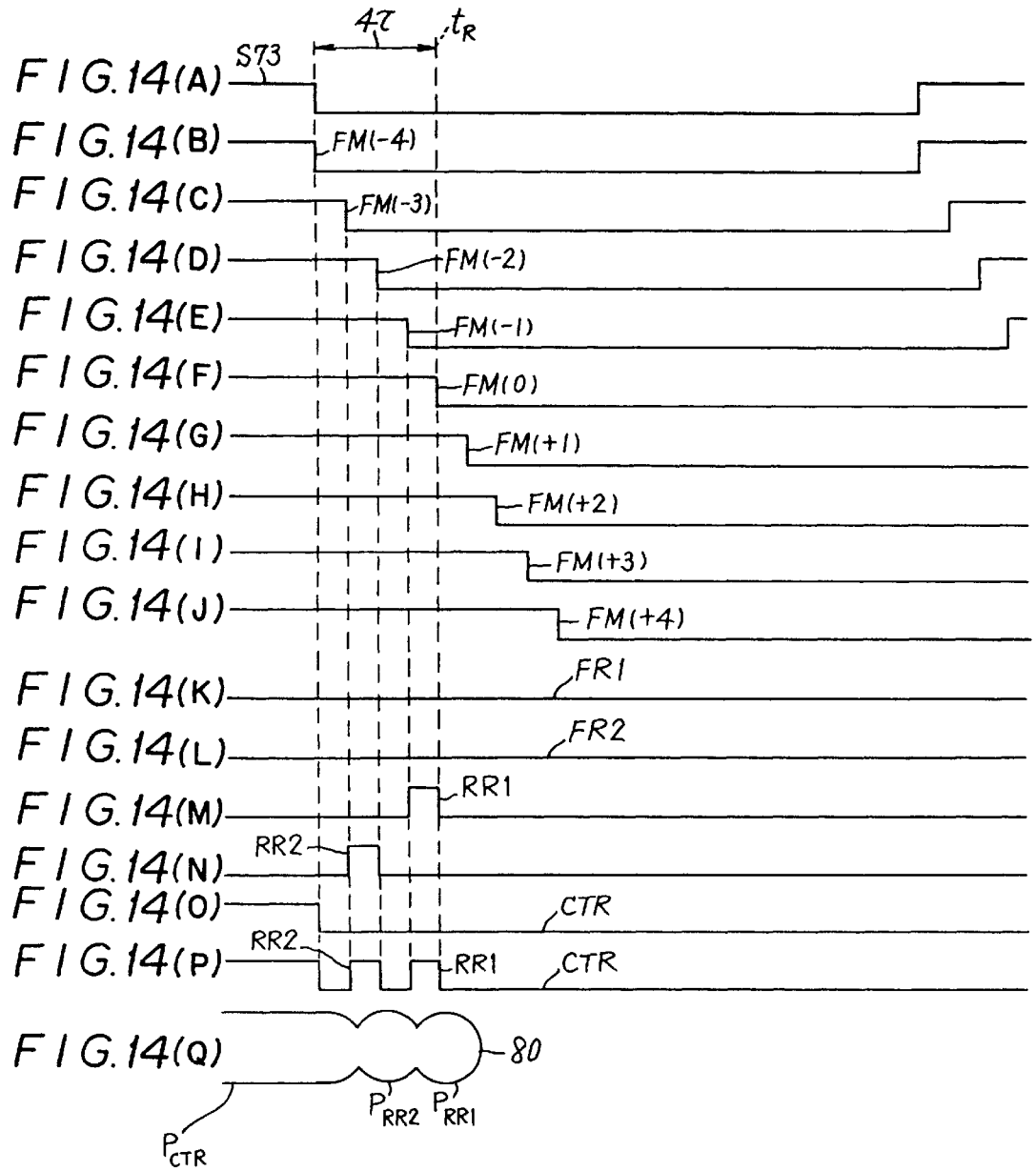
FIGS. 14A–14Q are signal waveform charts leading to the right side of the signal waveform chart in FIGS. 13A–13Q.

In FIG. 10, an input signal S71 being analog information is subjected to frequency modulation (FM modulation) of a carrier of prescribed frequency in an FM modulation circuit 71, and amplitude of an FM modulation signal S72 obtained as the result is limited in a limiter 72 thereby an FM record signal S73 with the logic level changed at the zero cross point is formed as shown in FIG. 13A and FIG. 14A.

The FM record signal S73 is supplied to a record signal forming circuit 75 constituted by a delay circuit 73 and a composite circuit 74, and a record signal S74 obtained at the output end thereof is recorded through a record circuit 76 and a light source 77 to a photomagnetic record disk 78.

Figure 11:
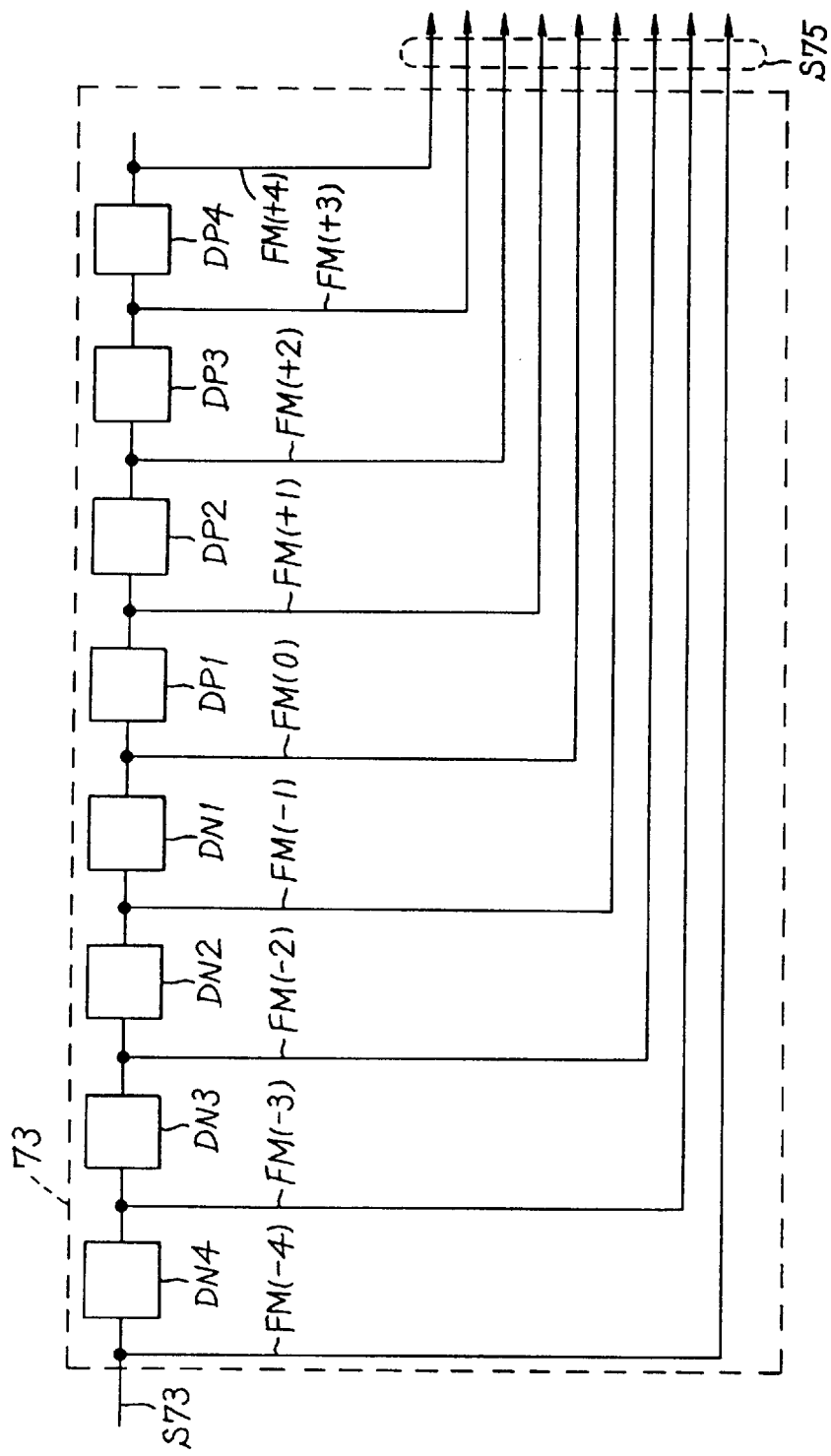
FIG. 11 is a connection diagram showing detailed constitution of a delay circuit of a record signal forming circuit of the photomagnetic recording apparatus in FIG. 10.

The delay circuit 73 as shown in FIG. 11 comprises eight delay elements DN4, DN3, DN2, DN1, DP1, DP2, DP3, DP4 with the delay time τ connected in series, and as shown in FIGS. 13B–13J and FIGS. 14B–14J, from a delay signal FM(−4) (FIG. 13B and FIG. 14B) being the FM record signal S73 at the input stage, delay signals FM(−3) (FIG. 13C and FIG. 14C), FM(−2) (FIG. 13D and FIG. 14D), FM(−1) (FIG. 13E and FIG. 14E), FM(0) (FIG. 13F and FIG. 14F), FM(+1) (FIG. 13G and FIG. 14G), FM(+2) (FIG. 13H and FIG. 14H), FM(+3) (FIG. 13I and FIG. 14I) and FM(+4) (FIG. 13J and FIG. 14J) are generated at the timing delayed by the delay time τ in sequence.

As a result, the timing generated by the nine delay signals FM(−4)–FM(+4) is in that with respect to the center delay signal FM(0) which rises at the time $t_F$ delayed by the delay time 4τ from the rising timing of the FM record signal S73 hence the delay signal FM(−4) and falls at the time $t_R$ delayed by the delay time 4τ from the falling timing of the delay signal FM(−4), the delay signal group S75 comprising the four delay signals arranged in sequence both at the forward side and at the rearward side in the time relation is supplied as output of the delay circuit 73 to the composite circuit 74.

Figure 12:
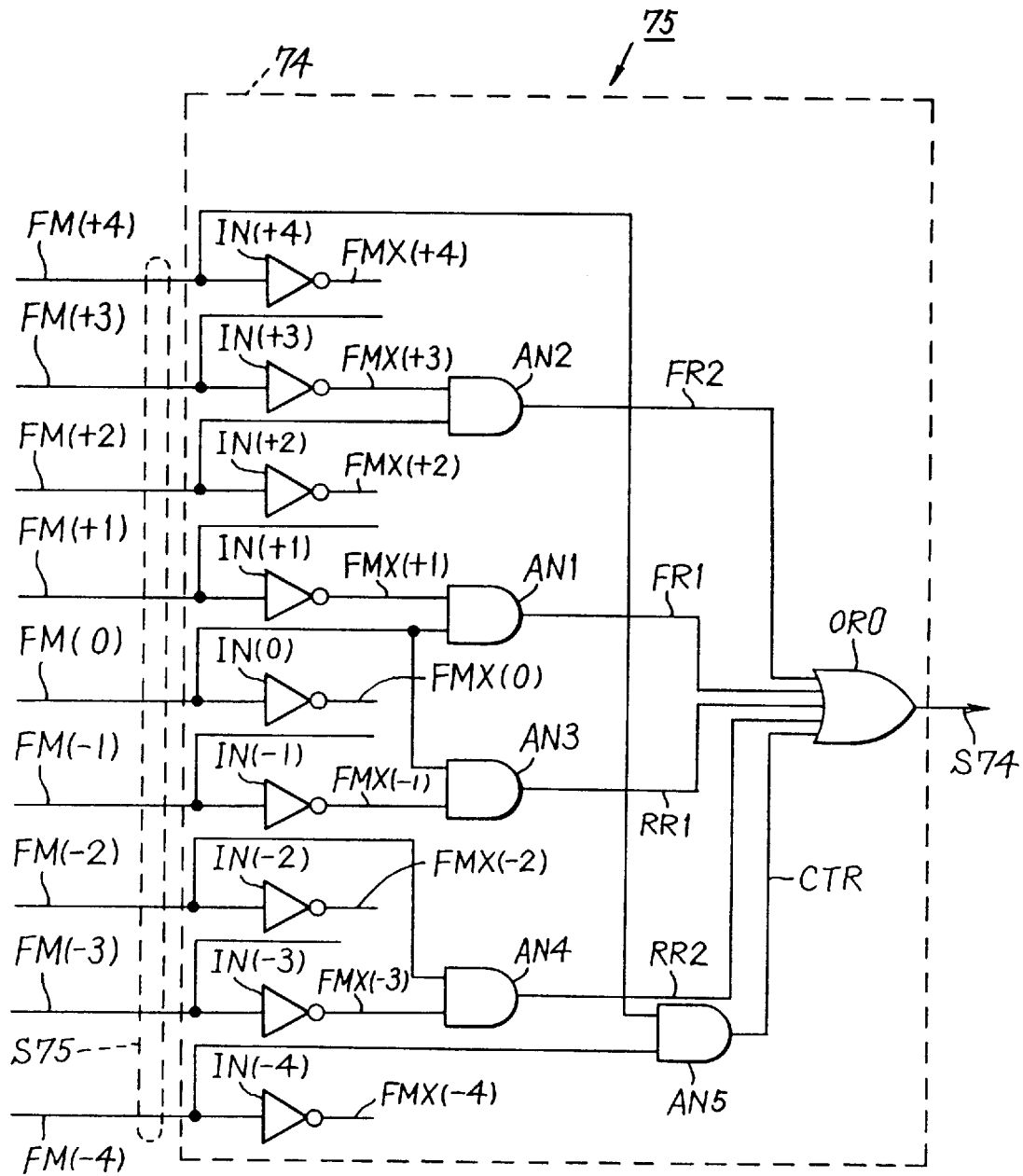
FIG. 12 is a connection diagram showing detailed constitution of a composite circuit of a record signal forming circuit of the photomagnetic recording apparatus in FIG. 10.

The composite circuit 74 as shown in FIG. 12 has inverters IN(−4)–IN(+4) to obtain inverted delay signals FMX(−4)–FMX(+4) by inverting each of the delay signals FM(−4)–FM(+4), and the AND operation and the OR operation of these delay signals FM(−4)–FM(+4) and FMX(−4)–FMX(+4) are executed, thereby in the vicinity of the rise and the fall of the center delay signal FM(0), a plurality of pulse waveforms are generated at the time positions symmetric with respect to the center position of the rise interval of the center delay signal FM(0).

That is, the AND circuit AN1 executes the AND operation between the center delay signal FM(0) and the inverted delay signal FMX(+1) as expressed by following formula $$FM(0) \cdot FMX(+1) = FR1 \qquad (2)$$

thereby a first front isolation pulse FR1 rising during the time τ is formed at the rising timing of the center delay signal FM(0) (FIG. 13F and FIG. 14F) as shown in FIG. 13K and FIG. 14K.

The AND circuit AN2 executes the AND operation between the delay signal FM(+2) and the inverted delay signal FMX(+3) as expressed by following formula $$FM(+2) \cdot FMX(+3) = FR2 \qquad (3)$$

thereby a second front isolation pulse FR2 rising during the time τ is formed at the lapse by the time τ from the falling of the first isolation pulse FR1 as shown in FIG. 13L and FIG. 14L.

The AND circuit AN3 executes the AND operation between the center delay signal FM(0) and the inverted delay signal FMX(−1) as expressed by following formula $$FM(0) \cdot FMX(-1) = RR1 \qquad (4)$$

thereby a first rear isolation pulse RR1 having the rise width of the time τ and falling at the falling timing of the center delay signal FM(0) is formed as shown in FIG. 13M and FIG. 14M.

The AND circuit AN4 executes the AND operation between the delay signal FM(−2) and the inverted delay signal FMX(−3) as expressed by following formula $$FM(-2) \cdot FMX(-3) = RR2 \qquad (5)$$

thereby a second rear isolation pulse RR2 having the pulse width τ and falling at the time forward by the time τ from the rising of the first rear isolation pulse RR1 is formed as shown in FIG. 13N and FIG. 14N.

The AND circuit AN5 executes the AND operation between the delay signals FM(−4) and FM(+4) as expressed by following formula $$FM(-4) \cdot FM(+4) = CTR \qquad (6)$$

thereby a center continuous pulse CTR rising at the time rearward by the time τ from the falling of the second front isolation pulse FR2 and then falling at the time forward by the time τ from the rising of the second rear isolation pulse RR2 is formed as shown in FIG. 13O and FIG. 14O.

The OR circuit OR0 executes the OR operation of the first and second front isolation pulses FR1 and FR2, the first and second rear isolation pulses RR1 and RR2 and the center continuous pulse CTR obtained from the AND circuits AN1–AN5 as expressed by following formula $$S74 = FR1 + FR2 + CTR + RR2 + RR1 \qquad (7)$$

thereby as shown in FIG. 13P and FIG. 14P, at the interval of the rising time $t_F$–the falling time $t_R$ of the center delay signal FM(0), a record signal S74 generating the center continuous pulse CTR at the nearly center time position and forming the two front isolation pulses FR2 and FR1 at the forward side thereof and the two rear isolation pulses RR2 and RR1 at the rearward side thereof is obtained, and the record signal S74 is transmitted from the composite circuit 74.

In the above-mentioned constitution, the FM modulation signal S72 modulated by the input signal S71 in the FM modulation circuit 71 is processed in the limiter 72, the delay circuit 73 and the composite circuit 74 (FIGS. 13A–13O and FIGS. 14A–14O thereby the record signal S74 having the two isolation pulses FR2, FR1 and RR2, RR1 respectively at the forward side and the rearward side of the center continuous pulse CTR is generated as shown in FIG. 13P and FIG. 14P.

Since the record signal S74 is supplied through a record circuit 76 to a light source 77, in a photomagnetic record disk 78, the position on the disk surface corresponding to the center continuous pulse CTR becomes the thermally stable state, thereby a center pit portion $P_{CTR}$ with definite width is formed as shown in FIG. 13Q and FIG. 14Q.

In the forward portion and the rearward portion (hence the start end portion and the finishing end portion), front end pit portions $P_{FR2}$, $P_{FR1}$ and rear end pit portions $P_{RR2}$, $P_{RR1}$ are formed by the isolation pulses FR2, FR1 and RR2, RR1.

The front end pit portions $P_{FR2}$, $P_{FR1}$ and the rear end pit portions $P_{RR2}$, $P_{RR1}$ as above described regarding FIGS. 5A–5G are formed by isolated pulses and therefore not made the tear drop shape, thereby shape of the top end portion of the front end pit portion $P_{FR1}$ and position of the rear end portion of the rear end pit portion $P_{RR1}$ can be detected stably thus the position information as the FM signal can be reproduced at high accuracy.

(4) Third Embodiment

Figure 16:
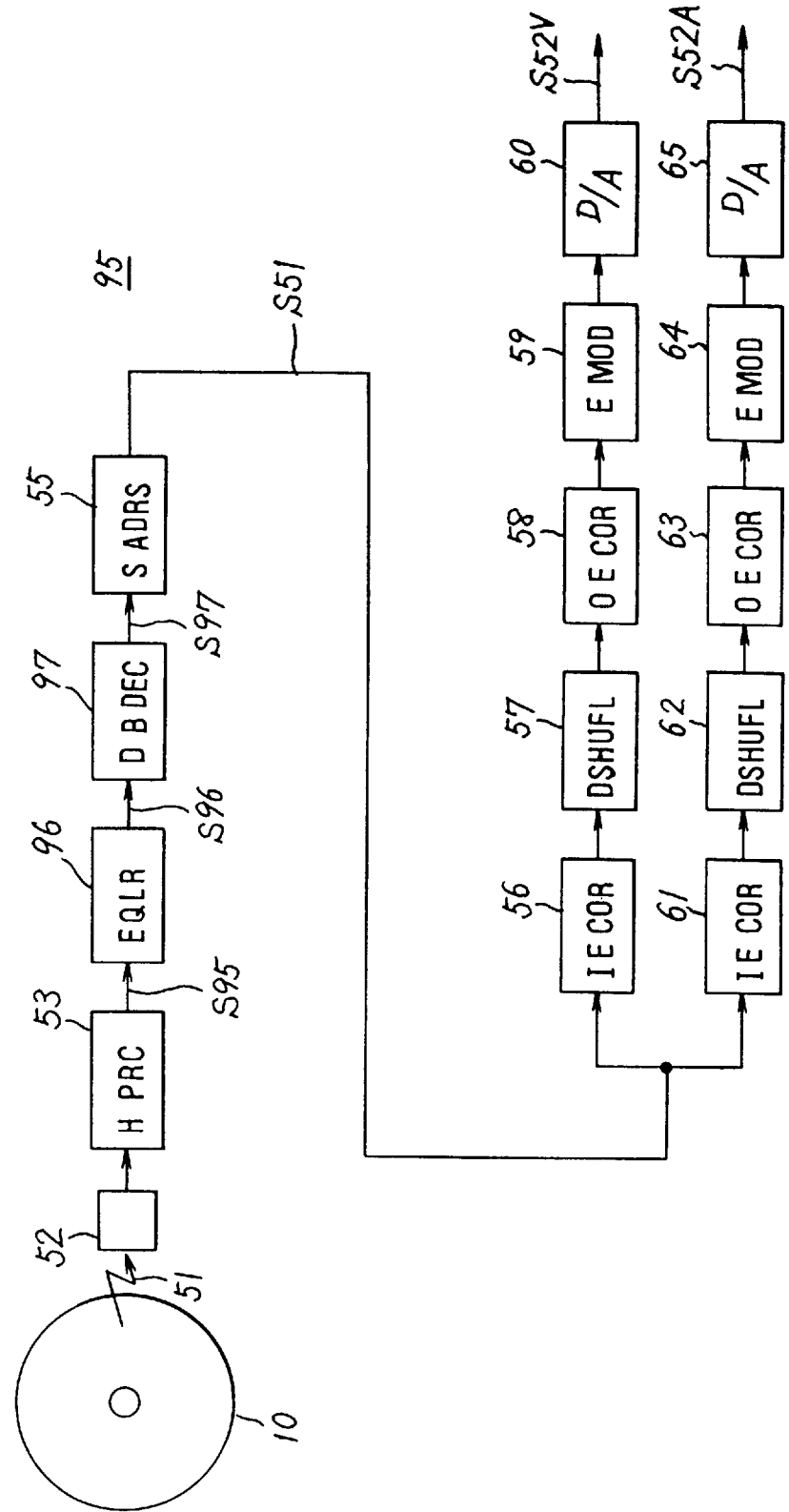
FIG. 16 is a block diagram showing a photomagnetic reproducing apparatus of a third embodiment.

In FIGS. 15 and 16 where parts corresponding to those of FIGS. 6 and 7 are designated by the same reference numerals, a third embodiment of the invention includes a photomagnetic recording apparatus 90 and a photomagnetic reproducing apparatus 95. In the third embodiment, transmission system of the reproducing is constituted to transmit the digital information in partial response (1, 1) system (so-called duo binary system).

As known well, in the transmission of the partial response system, precode is applied to the digital information. However, in the third embodiment, the digital information with the precode applied thereto is recorded to a photomagnetic record disk 10 by the pit forming method according to the invention, and a multi-value reproducing signal of duo binary code is obtained from the reproduced signal and is converted into a binary signal thereby the original digital information is restored.

That is, in the photomagnetic recording apparatus 90, a composite signal S23 transmitted from a time division multiplexer 25 is inputted to a synchronous address adder 31, and after a synchronous signal and an address signal are added thereto if necessary, the signal is inputted to a precode circuit 91.

The precode circuit 91 converts a signal S90 (FIG. 17A) comprising the composite signal S23 with the synchronous signal and the address signal added thereto at the reproducing side into a record source signal S91 comprising a binary signal suitable to obtain a multi-value reproducing signal of duo binary code from the reproducing signal, and supplies the record source signal S91 to a pulse modulation circuit 33. The precode circuit 91 has such circuit constitution that the original digital information and information delayed from the original digital information by one bit clock are added in modulo 2.

The pulse modulation circuit 33 generates a drive pulse signal S92 comprising a signal similar to the drive pulse signal S14 as above described regarding FIG. 5D or 5F based on the record source signal S91 similarly to the above description, and irradiates the drive pulse signal S92 as a record light beam 36 through an optical head processor 34 from a light source 35 comprising a laser diode onto a photomagnetic record disk 10.

Thus according to the photomagnetic recording apparatus 90 of FIG. 15, the light source 35 is not lit directly based on the record source signal S91, but the record source signal S91 is pulse-modulated into a drive pulse signal S92 generated at prescribed period and the light source 35 is intermittently driven for emission by the drive pulse signal S92, so that a nearly circular magnetic domain can be formed at the start end of the pit 4 formed on the photomagnetic record disk 10 similarly to the first embodiment thereby the record information at the start end of the pit 4 can be recorded correctly.

When the record information is reproduced from the pit 4 formed on the photomagnetic record disk 10 in this manner, the photomagnetic reproducing apparatus (FIG. 16) receives a reflected light beam 51 from the photomagnetic record disk 10 at a light pickup 52, and supplies a light reception output signal S95 obtained as the result through a light processor 53 to an equalizer 96. The equalizer 96 is a circuit for equalizing the light reception output signal S95 into a signal of duo binary code.

In practice as shown in FIG. 18, the light reception output signal S95 from the optical head processor 53 has frequency characteristics T1 called MTF (modulation transfer function) where the amplitude gain falls in response to the space frequency of the optical transmission system.

Consequently, in the equalizer 96, the light reception output signal S95 is equalized by equalizing characteristics T2 so as to convert the frequency characteristics T1 into frequency characteristics of duo binary code, thereby a light reception output signal corresponding to the frequency characteristics T3 of duo binary code, i.e., a duo binary signal S96 (FIG. 17B) is obtained.

In the duo binary signal S96 as known well, the frequency band is compressed to ½ in comparison to the original digital information of the binary signal and the logic level has three values of V, 0, −V. Among these values of the logic level, V and −V correspond to "1" of the original digital information, and value 0 corresponds to "0". The level transfer between respective logic levels is in that the level is not transferred directly from V to −V or from −V to V, but always transferred through 0.

Such a duo binary signal S96 is supplied to a duo binary decoder 97.

The duo binary decoder 97 is a circuit which discriminates the binary logic level corresponding to the logic levels V, 0, −V in the first and second reference levels TH1 and TH2 regarding the duo binary signal S96, and restores a reproduced output signal S97 (FIG. 17C) of the original digital information. The reproduced output signal S97 is supplied to a synchronous address decoder 55.

Thus a composite signal S51 similar to the composite signal S23 obtained at the output end of the time division multiplexer 25 of the photomagnetic recording apparatus 90 can be obtained at the output end of the synchronous address decoder 55, and after video data included in the composite signal S51 is subjected to the error correction processing in an inner error correction circuit 56, the corrected data is deshuffled in a deshuffling circuit 57 and subjected to outer error correction processing in an outer error correction circuit 58 and error modification processing in an error modification circuit 59 and then transmitted as a video output signal S52V through a digital/analog converter 60.

At the same time, audio data included in the composite signal S51 is also reproduced through an inner error correction circuit 61, a deshuffling circuit 62, an outer error correction circuit 63, an error modification circuit 64 and a digital/analog converter 65 into an audio output signal S52A.

Thus in the photomagnetic recording apparatus 90 and the photomagnetic reproducing apparatus 95, shape at the start end can form the pit 4 being not made the tear drop shape as in the prior art, thereby the bit 4 can be realized in good bit separation, and the photomagnetic reproducing method being favorable for the reproducing of the multi-value signal by duo binary code of the partial response (1, 1) system can be realized.

As known well, since the duo binary code is a code system utilizing the intercode interference positively and the code is strong in the intercode correlation, the duo binary code is liable to be affected by the phase shift (for example, edge shift) of the transmission system and discrimination of each logic level having three values is difficult. In this point, the pit forming method according to the invention being good in the bit separation is favorable for the transmission of the multi-value signal such as the partial response (1, 1) system.

Thus since the record information of the photomagnetic disk 10 is reproduced in multiple values, the optical transmission system can be operated at the low frequency band in the space frequency of MTF and the reproduced output signal S97 can be realized with the C/N significantly improved.

(5) Other Embodiments (5-1) In the embodiments as above described, throughout the whole range of the period where the record signal (FIG. 5C) rises to the logic "1" level, the drive pulse signal S14 (FIG. 5D or 5F is generated at the interval of the prescribed sampling period $T_S$, thereby the record spot 4 having the magnetic domain of nearly circular shape is formed on the photomagnetic record disk at every time. In place of this, however, a record pit with a magnetic domain of circular shape may be formed only at the rising portion or the falling portion of the record signal S13, and during the period therebetween, a drive signal of constant level may be generated, thereby the record pit having similar shape substantially to that of a portion excluding the start end 4A among the pit in the prior art (FIG. 2D) is formed.

In this constitution, fear of failing in reproducing the position information at the rising potion and the falling portion of the record signal S13 can be eliminated, thereby the information can be recorded on the photomagnetic record disk at the significantly high accuracy in comparison to the prior art.

Further in the case of the embodiment, the drive pulse signal at the finishing end portion may be omitted and the continuous signal succeeding the intermediate potion may be formed, thereby similar effect to the case as above described can be obtained.

In addition, since the subsequent drive signal does not exist at the finishing end in this case, the magnetic domain of nearly circular shape can be formed similarly to the case where the drive pulse is received substantially.

(5-2) In the embodiments as above described, the pulse amplitude $P_H$ of the drive pulse signal S14 (FIG. 5D or 5F) is made the constant value uniformly during the interval where the record signal S13 rises to the logic "1" level. In place of this, however, variation of the amplitude of the intermediate potion or other variation may be made if necessary.

(5-3) In the third embodiment as above described, the record information of the photomagnetic record disk is reproduced in multiple values as duo binary code using the partial response (1, 1) system. However, the invention is not limited to this, but the multi-value reproducing may be performed in various systems such as other partial response system, thereby similar effect to that of the embodiment can be realized.

What is claimed is:

1. Photomagnetic recording apparatus comprising:

means for applying a magnetic flux to a region of a photomagnetic recording medium;

a light source for irradiating said region of said recording medium with a recording light beam to form a pit;

record signal generating means for generating a record signal that is a frequency modulated carrier signal waveform having leading and trailing edges;

pulse generating means including delay means for delaying said record signal by discrete, successive time delays to produce delayed signals, and including discrete inverse time delays for time delaying each delayed signal and gating logic for gating those delayed signals which have the same logic value as the result of a preceding time delay in the succession of said time delays, thereby gating those delayed signals that correspond to the leading and trailing edges to produce a predetermined number of pulses of predetermined width and spacing in response to at least the leading edge of said record signal; and drive means for receiving said predetermined number of pulses and driving said light source to produce on said photomagnetic recording medium a group of substantially circular magnetic domains at the beginning of said pit.

* * * * *